H. LEFÈVRE.
Magic-Lantern.

No. 220,078. Patented Sept. 30, 1879.

Witnesses:
J. H. Shumway
Jos. C. Earle

Henri Lefèvre.
Inventor.
By atty.

UNITED STATES PATENT OFFICE.

HENRI LEFÈVRE, OF PARIS, FRANCE.

IMPROVEMENT IN MAGIC-LANTERNS.

Specification forming part of Letters Patent No. 220,078, dated September 30, 1879; application filed August 13, 1879.

*To all whom it may concern:*

Be it known that I, HENRI LEFÈVRE, of Paris, France, have invented a new Improvement in Magic-Lanterns; and I do hereby declare the following, when taken in connection with the accompanying drawings and the letters of reference marked thereon, to be a full, clear, and exact description of the same, and which said drawings constitute part of this specification, and represent, in—

Figure 1:
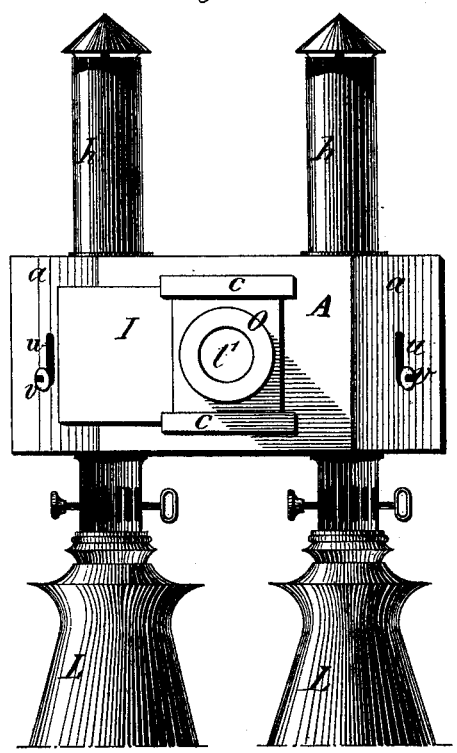
Figure 2:
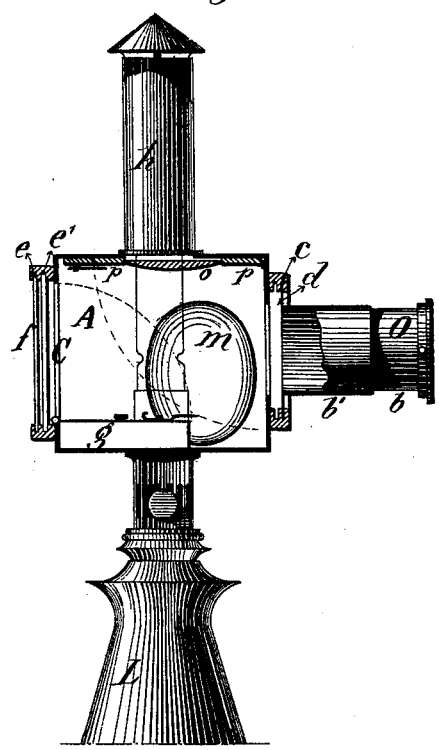
Figure 3:
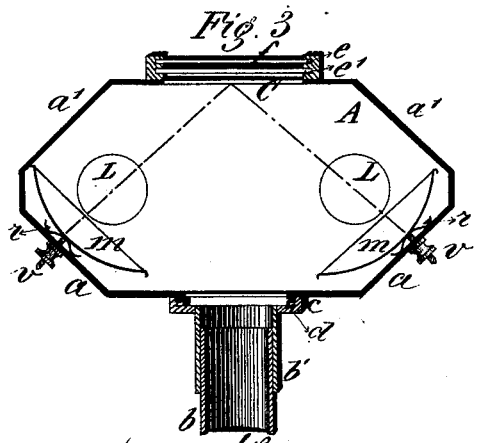

Figure 1, a front view; Fig. 2, a vertical section; Fig. 3, a horizontal section as arranged as a megascope for throwing opaque images, and Fig. 4 a horizontal section arranged as a magic-lantern.

The object of my invention is an illuminating apparatus of a particular description, and so arranged that by an easy transformation opaque or transparent pictures may be thrown upon the wall.

The instrument is placed on any two lamps, or two lamps may be put in the box with the apparatus.

I will, in connection with the annexed drawings, describe the construction of my apparatus and the manner of using it in throwing the pictures on the wall.

The apparatus is composed of a long box, A, its two sides, $a$ $a'$, at an angle of forty-five degrees. This is placed on two lamp-globes, L, of any kind having the same light. The rays thrown by these lamps are reflected by mirrors $m$, of elliptic or other form, placed at the two ends $a$ on the opaque body, Figs. 2 and 5, placed at C, which is illuminated in such manner as to enlarge the image.

As soon as the object-glass is arranged the image at C is shown enlarged on a white screen placed on the wall opposite. The object-glass in this case is formed of a double-convex lens, $l$, arranged in the front of a tube, $b$, which moves with friction in the tube $b'$ applied on the plate $d$, which is held in the front groove, $c$, of the box A. On the end opposite the object-glass is placed a grooved frame. This groove $e$ receives a black screen, $f$, which prevents the rays of light from passing beyond. The object $c$ to be illuminated is placed in the groove $e'$.

Figure 4:
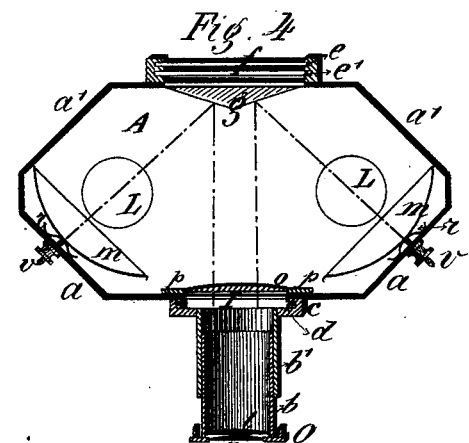

In order to convert the apparatus into a magic-lantern, Fig. 4, I raise and hold in this raised position a reflector, $g$, formed of two plane surfaces inclined at an angle of twenty-two degrees five minutes to the plate which supports them. The luminous rays are then reflected from the mirrors $m$ to the reflector $g$, and these are reflected on the transparent image I held in the groove $C'$ of the frame which carries the object-glass. In order to change the image thrown on the screen it is only necessary to pull out or push in the tube $b$ and lens $l$ in the tube $b'$.

The luminous rays reflected parallelly, Fig. 4, cross at first the bright lens $o$, behind which is placed the transparent image I. This additional lens $o$ is held in a frame, $p$, Figs. 2 and 4, united to the top of the box by a small hinge. This frame is raised, Fig. 2, when the apparatus is to be used as a megascope, and lowered when it is to be used as a magic-lantern.

When the apparatus is to be used as a magic lantern, Fig. 4, the lens $l'$ is joined to the object-glass. The luminous focus of the lamp is generally from seven to eight centimeters above the globe. I place my apparatus fifteen centimeters above, so that the centers of the reflectors and the object-glass are seven centimetres from one base and eight from the other. You will then be able, following the height of the lamp-wicks employed, to place the apparatus on one or the other of these bases, so that the luminous focus is always found in the optical axis of the reflectors.

In order to avoid a deposit of smoke on the lens when the apparatus is placed on the lamps, I leave a small space between the box A and the plate $d$ of the glass, so as to allow the air to carry off the vapors which would be condensed on this lens. If necessary, the air can be forced through the tube which holds the lens.

The grooves allow the circulation of air around the images and the apparatus, thereby avoiding injury of the apparatus by heat, whatever may be the material of which it is formed. The chimney $h$, with metal caps, insures the ventilation of the interior of the apparatus.

In order to prevent the oxidation of the reflectors when not in use in the apparatus, the openings of the box can be closed behind by a screen, and before by the object-glass held by a plate in the groove $c$.

The caps of the chimneys may be taken off and placed in the box, the chimneys dropped into the box, and all openings closed when not required for use or for transportation.

The reflectors $m$ are held by means of screws $v$ and supported by springs $r$. The screws may be moved vertically in the grooves $u$, which allows the adjustment of the position of the reflectors.

I claim—

The combination of the box A, two lamps, L, reflectors $m\ m$, the object-glass $o$, adjustable tube carrying the lens $l$, and the removable double-inclined reflector $g$, all arranged substantially as described, whereby the apparatus may be used as a magic-lantern or as a megascope.

In testimony whereof I have signed my name to this specification before two subscribing witnesses.

H. LEFÈVRE.

Witnesses:
 GEO. H. SCIDMORE,
 A. CABY.